United States Patent [19]

Muhr

[11] Patent Number: 5,795,437
[45] Date of Patent: Aug. 18, 1998

[54] FRICTION WELDING DEVICE

[75] Inventor: Emil Muhr, Glattbach, Germany

[73] Assignee: Branson Ultraschall Niederlassung der Emerson Technology GmbH & Co., Dietzenbach, Germany

[21] Appl. No.: 758,960

[22] Filed: Dec. 2, 1996

[30] Foreign Application Priority Data

Dec. 1, 1995 [DE] Germany ............ 195 45 132.5

[51] Int. Cl.$^6$ ................................................ B29C 65/06
[52] U.S. Cl. ............................ 156/580; 156/73.5; 310/36
[58] Field of Search ........................ 156/73.1, 580, 156/580.2; 310/15, 17, 36; 228/112.1, 2.1

[56] References Cited

U.S. PATENT DOCUMENTS

| 3,613,982 | 10/1971 | Hollenberg et al. | 228/2.3 |
| 5,160,393 | 11/1992 | Snyder | 156/73.5 |
| 5,277,744 | 1/1994 | Snyder | 156/580 |
| 5,378,951 | 1/1995 | Snyder | 310/17 |
| 5,464,498 | 11/1995 | McGrath | 156/580.2 |
| 5,468,336 | 11/1995 | Lotz et al. | 156/580.2 |

FOREIGN PATENT DOCUMENTS

| 64737 | 5/1983 | European Pat. Off. |
| 659516 | 10/1994 | European Pat. Off. |
| 852711 | 7/1949 | Germany |
| 4208053 | 9/1992 | Germany |
| 4406220 | 10/1995 | Germany |
| 2124383 | 5/1991 | Japan |
| 2224384 | 5/1991 | Japan |
| 5177365 | 7/1993 | Japan |
| 5177366 | 7/1993 | Japan |

OTHER PUBLICATIONS

Der Katechismus fur die Ankerwickelei, Fritz Raskop, Technischer Verlag Herbert Gram, Berlin, 1964, pp. 310–311.

Primary Examiner—James Sells
Attorney, Agent, or Firm—Emrich & Dithmar

[57] ABSTRACT

The present invention relates to a friction welding device for joining workpieces, preferably those of thermoplastic material, comprising a stationary support, an oscillating platform and a plurality of flexural rod-like members connecting said support and said platform and an electromagnetic drive motor for driving said platform in an orbital motion. According to the invention, the electromagnetic drive motor comprises electro-motor components as they are commercially available, i. e. a drum-type cylindrical rotor composed of laminated iron sheets, preferably of the squirrel-cage type and a stator having slots provided along its inner periphery, all these parts being cheaply available since they are mass products in manufacturing asynchronous motors.

6 Claims, 3 Drawing Sheets

FRICTION WELDING DEVICE

The present invention relates to a friction welding device for joining workpieces, preferably those of thermoplastic material, comprising a stationary support, an oscillating platform and a plurality of flexural rod-like members connecting said support and said platform and an electromagnetic drive motor for driving said platform in an orbital motion.

BACKGROUND OF THE INVENTION

European Patent 0 504 494 discloses a friction welding machine comprising an electromagnetic drive motor producing a reciprocating or an orbital motion of a plate which is mounted to flexural rod-like members, said plate carrying one of the workpieces to be welded to another workpiece which is held stationary in a stationary support. In welding both the workpieces are clamped together. An orbital motion may be defined as a circular or an elliptical motion, i.e. the oscillating workpiece continuously moves with a predetermined amplitude around a center which is defined by the central position of the oscillating plate upon cessation of the motion. It has been shown that orbital welding machines of this type are superior to welding machines merely undergoing a translating reciprocating motion, where the oscillatory platform comes to a stop at the end of each oscillating amplitude before the motion is reversed, as well as to spinning welding machines where the rotational speed varies in response to the operating radius in welding workpieces which are rotationally symmetrical.

The electromagnetic drive motor as disclosed in European Patent 0 504 494 comprises a stator having salient poles including windings and an armature of polygonal shape inside the stator, said armature carrying the oscillating platform. The faces of both the armature and salient poles opposing each other are plane. The armature and the stator are composed of laminated iron sheets.

It is the primary object of the present invention to provide a friction welding device including a drive motor featuring a simplified structure and causing less expenditure in manufacturing.

According to the invention, the electromagnetic drive motor comprises electro-motor components as they are commercially available, i. e. a drum-type cylindrical rotor composed of laminated iron sheets, preferably of the squirrel-cage type and a stator having slots provided along its inner periphery, all these parts being cheaply available since they are mass products in manufacturing asynchronous motors. Since the rotor does not plainly rotate, but, rather performs an orbital motion, the stator winding must be designed such that in contrast to the regular winding of an asynchronous motor the stator winding generates a peripherally propagating magnetic field which unidirectionally attracts the rotor which is thus driven in an orbital motion. A further distinction with respect to the standard electric motor resides in the fact that the air gap between the rotor and the stator is greater than the desired radial amplitude of the orbital motion. In utilizying commercially available electric motor components a substantial cost reduction of the drive motor can be obtained, as well as a smaller size thereof in contrast to a drive motor having salient poles and an armature of polygonal shape. Furthermore, the number of poles in the drive motor according to the invention may be easily increased to improve a uniform rotation.

BRIEF DESCRIPTION OF THE DRAWINGS

An embodiment of the present invention is described in the following with reference to the drawings which show.

DETAILED DESCRIPTION OF THE INVENTION

Figure 1:
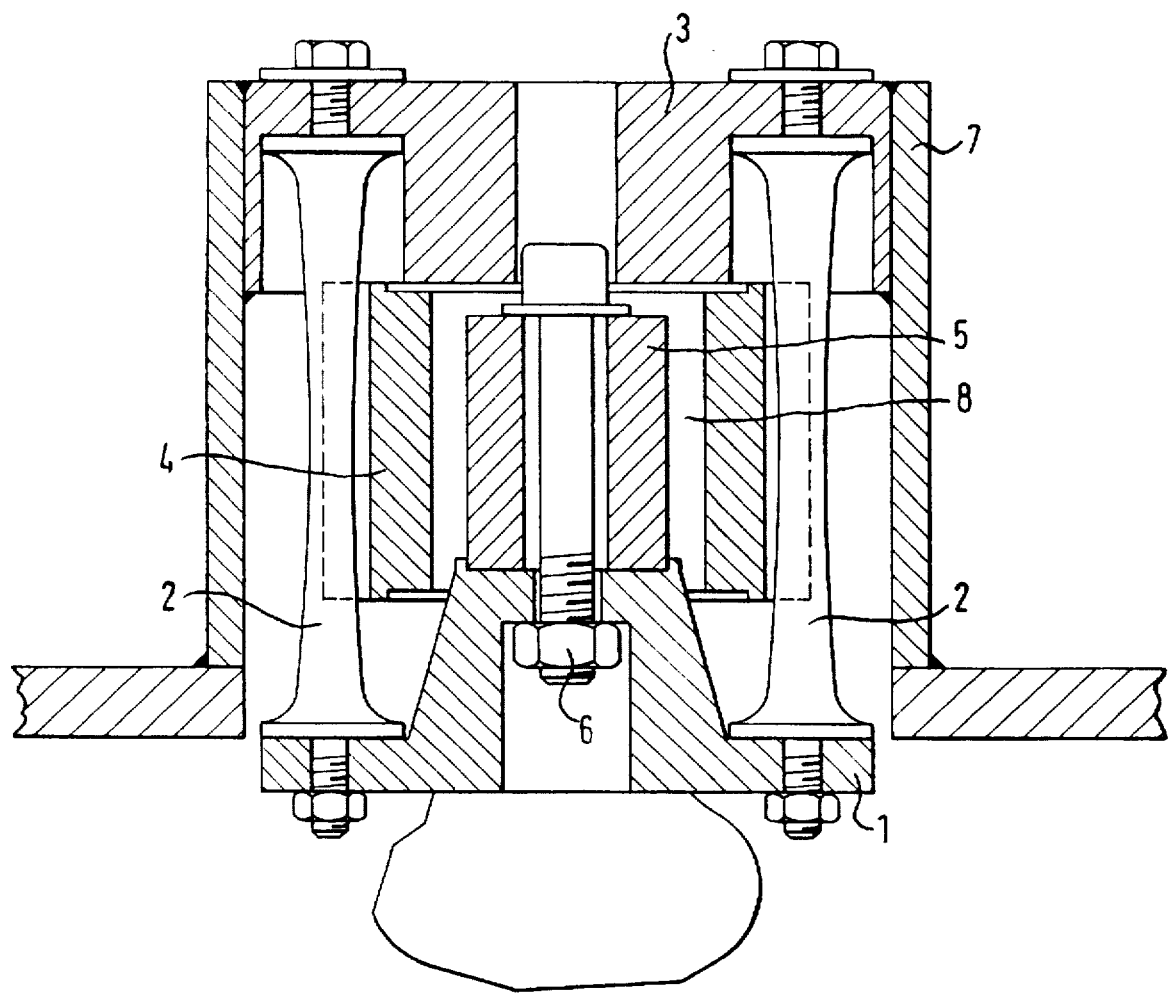
FIG. 1 is a section of a vibratory head drive motor of a friction welding device.
Figure 2:
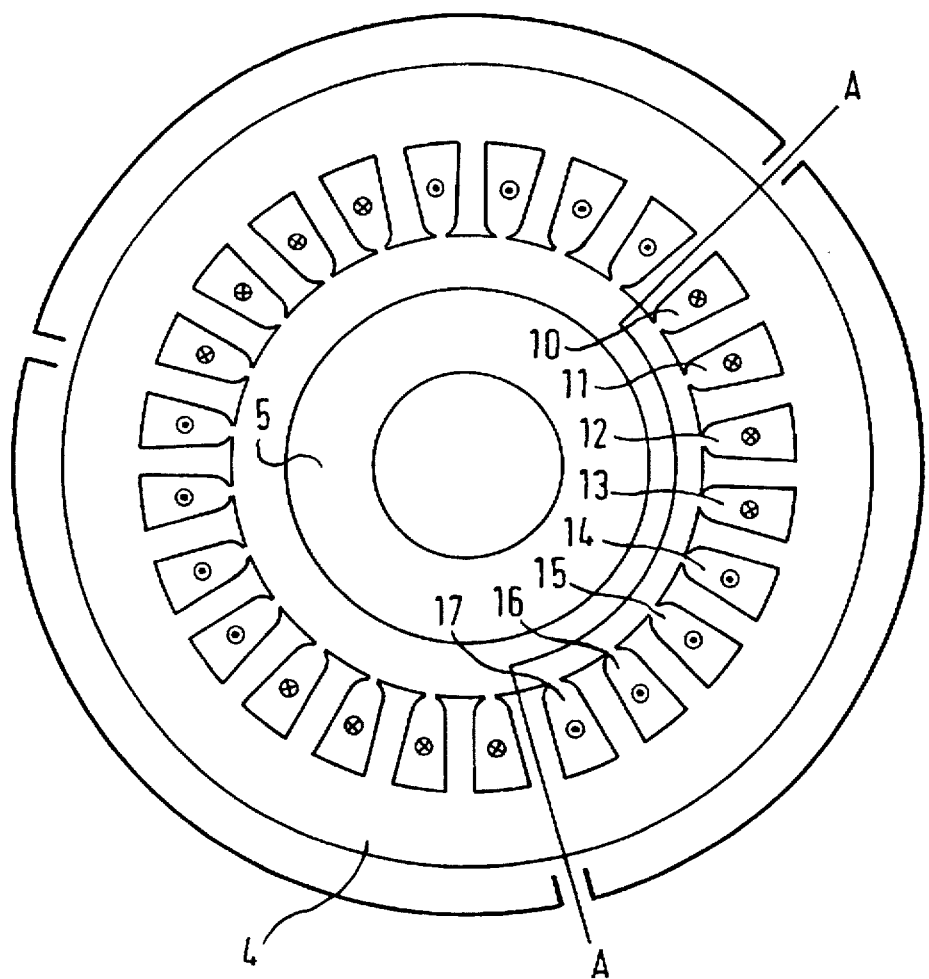
FIG. 2 is a section of the electromagnetic drive motor indicating the direction of the current flow through the stator conductors.

As shown in FIG. 1, a vibratory platform 1 is mounted to a stationary support plate 3 through a plurality of peripherally spaced flexural rods 2. The illustration shows two rods 2 only. The vibratory platform 1 carries a support (not shown) for securing a first workpiece (not shown). A stationary support including a means for securing a second workpiece is located below the vibratory platform 1 and is movably arranged with respect to said first workpiece such that both workpieces are clamped together for joining the workpieces in a bonding plane where the joining surfaces of both the workpieces become soft under the influence of frictional energy induced by the orbital motion. Details of the bonding process are disclosed in U.S. Pat. No. 3,920,504, for example, "FRICTION WELDING APPARATUS". A stator 4 has an upper end face which is rigidly secured to the lower side of the support plate 3 inside the flexural rods 2. The stator 4 is of cylindrical shape and has a plurality of slots 10, 11, 12 etc. provided along its inner periphery as FIG. 2 shows, said slots accommodating the conductors of the windings. Inside the stator 4 a cylindrical rotor 5, i.e. of the drum-rotor type is provided which is secured by bolt means 6 to the upper surface of the vibratory plate 1. The support plate 3 is mounted to a frame 7 or an upper yoke of the friction weld. An air gap 8 is provided between the stator 4 and the rotor 5.

While the drive motor produces forces resulting in an orbital motion of the rotor 5 and thus of the vibratory plate 1, the flexural rods 2 yield in the direction of the orbital motion. The orbital motion is substantially performed in a plane. As soon as during welding the material, preferably thermoplastic material becomes soft at the bonding surfaces of both the workpieces to be joined, the drive motor is deactivated and the flexural rods return the vibratory plate to its rest position such that the workpieces are joined to be in a predetermined alignment upon cessation of the motion.

FIG. 2 is a section of the stator including a plurality of slots 10 provided along the cylindrical inner periphery. In the embodiment shown the stator comprises a total of 24 slots, eight of which each are occupied with conductors forming a coil such that a total of three coils result each coil being electrically connected to a phase of a three-phase alternating circuit network. The scheme of the windings, i.e. the arrangement of the conductors in the slots must be composed such that the magnetic attraction produced by the magnetic field is continuously directed to one side, i.e. unidirectionally, when the electric field rotates. Accordingly, the rotor undergoes an excursion with respect to its central rest position, thus moving close towards the side of the stator which is just activated. FIG. 2 thus shows a three-phase system. Each phase is subdivided in a pair of groups of slots. In either group the slots are located adjacent to each other and the direction of the current flowing through the conductors of the respective groups is in opposition to each other. The current flow direction in the groups of the three-phase winding is shown in FIG. 2. The current flow direction is alternating in accordance with a three-phase alternating current network.

Figure 3A:
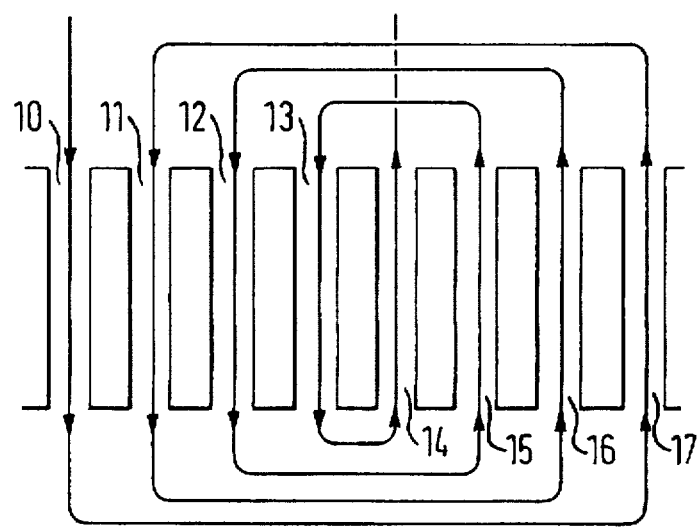
FIGS. 3A and 3B show portions of two different schemes of windings used for obtaining an orbital motion.
Figure 3B:
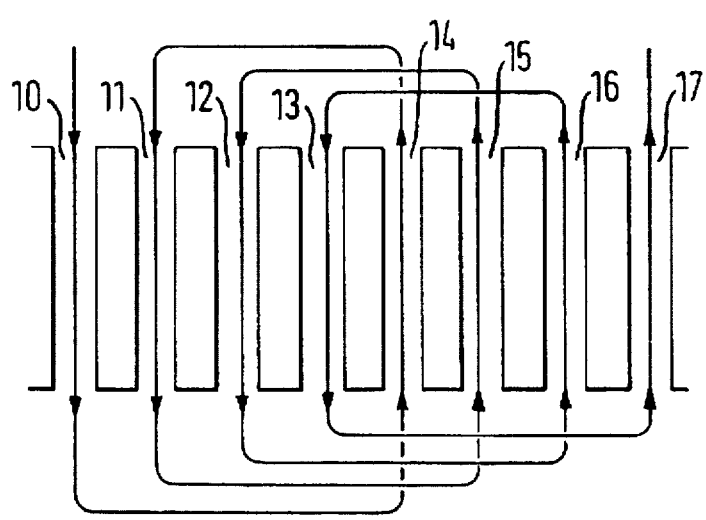

FIG. 3A shows a diagram of the winding in one of the phases of a three-phase AC network according to lines A—A in FIG. 2. Accordingly, the slots 10 through 13 define a first group accommodating conductors through which the current flows in the direction indicated by the arrows, while the slots 14 to 17 define a second group of this phase accommodating conductors through which the current flows in opposite direction. The electrical connections of the conductors at either face of the stator are shown in FIG. 3A, while FIG. 3B shows a different mode of connections which, however, serves the same purpose. According to both embodiments, the current flow through the conductors in both groups composed of a plurality of adjacent slots alternatingly reverses and thus results in a unidirectional attraction force acting on the rotor. Since three winding coils of this type are provided along the periphery of the stator to be connected to a three-phase A.C. network, this results in a magnetic rotational field such that the unidirectional attraction of the rotor propagates in a peripheral direction and thus the rotor performs the orbital motion desired.

Obviously the number of slots and the number of poles may be varied such that the uniformity of the orbital motion may be improved when selecting a higher number of poles. The rotor itself may be composed from laminated iron sheets alone, however, the rotor may be provided with a squirrel-cage winding as well when desired.

I claim:

1. A friction welding device for joining workpieces, comprising a stationary support, an oscillating platform and a plurality of flexural rod-like members connecting said support and said platform and an electromagnetic drive motor for driving said platform in an orbital motion with respect to said stationary support, wherein said workpieces are mounted to said support and said platform, respectively, including means for clamping said workpieces towards each other, said electromagnetic drive motor including an electric motor having a cylindrical rotor and a stator, with an airgap between the cylindrical rotor and the stator greater than the vibrational amplitude of said orbital motion, and a winding disposed in slots of the stator, said winding generating a rotating magnetic field exerting a unidirectional attraction of said rotor.

2. The frictional welding device of claim 1, wherein the electromagnetic drive motor is electrically connected to a three-phase A.C. network, and wherein the individual conductors of a coil of a phase are located in adjacent slots of a pair of groups following each other in a peripheral direction and wherein the direction of the current flow through said conductors is opposite to each other in both said groups.

3. The frictional welding machine of claim 2, wherein with reference to a first stator face conductors emerging from the first through last slots of said first group are respectively connected to conductors in the last through first slots of said second group, and wherein with reference to the opposite stator face conductors emerging from the last through second slots of said second group are respectively connected to conductors in the second through last slots of said first slot group.

4. The frictional welding device of claim 2, wherein with reference to the one stator face conductors emerging from the first through last slots of said first group are respectively connected to conductors in the first through last slots of said second group, and wherein with reference to the opposite stator face a conductors emerging from the first through second last slots of said second group are respectively connected to conductors in the second through last slots of said first group.

5. The frictional welding device of claim 1, wherein the number of poles of the winding is greater or smaller than three poles.

6. The frictional welding device of claim 1, wherein said flexural members are mounted to a lower face of a stationary support platform, wherein a head face of said stator is mounted to the lower side of said support platform inside said flexural members, and wherein a vibrating platform is mounted to the free ends of said flexural members, said vibrating platform mounting the rotor of the electric drive motor.

* * * * *